Patented Oct. 20, 1953

2,656,275

UNITED STATES PATENT OFFICE 2,656,275

PROCESS FOR TREATING A MARINE PRODUCT

Charles B. Stevenson, Wilmington, Calif., assignor, by mesne assignments, to Quaker Oats Company, Chicago, Ill., a corporation of New Jersey No Drawing. Application December 19, 1949, Serial No. 133,967

3 Claims. (Cl. 99—111)

This invention relates to a method for treating fish and other marine products with sulphur dioxide so as to increase their palatability, reduce their odor and prevent discoloration of the product produced thereby, and to the product resulting from such treatment.

Fish and other marine products provide an excellent food for household pets and a large quantity of pet food, the principal ingredient of which is fish, is consumed each year. In the majority of such products, fish in relatively small pieces is mixed with some common form of cereal and water, cooked and canned. While such a mixture will generally be satisfactory, it has been found that the palatability of the mixture varies considerably with the particular kind of fish used. Thus pets demonstrate a decided preference for mixtures containing certain fish and many will refuse altogether to eat mixtures containing others. Such refusal has been found to be the result of the low palatability of what will hereinafter be referred to as off-specie fish and also of the tendency of such fish to possess a strong unpleasant odor and to markedly discolor after preparation and canning. It is the purpose of this invention to provide a process which will eliminate these undesirable characteristics found in many types of marine products and to provide a satisfactory pet food prepared from the off-specie fish. For example, many attempts have been made to obtain a satisfactory canned fish product from Ling Hake, an Atlantic Ocean fish. Such attempts have failed due to the obnoxious odor and unpalatable taste of this fish. When, however, Ling Hake is treated in the manner hereinafter described, a highly satisfactory product is obtained.

It has been found that when marine products, and particularly fish, are treated in their natural state with free $SO_2$ in the manner hereinafter described, such treatment increases the palatability of the product, reduces its disagreeable odor and prevents subsequent undesirable discoloration.

It is recognized that the treatment of food products with $SO_2$ has previously been employed for the purpose of preserving such products. Such treatment however, requires relatively high concentrations of free $SO_2$ in the product, thus concentrations on the order of 1000 parts per million or greater have been employed; further it is essential in such treatment that the $SO_2$ remain in the final product if its preservative effect is to be realized and for this reason steps must be taken to insure that $SO_2$ remains in the final product despite the fact that the necessary concentrations of $SO_2$ impart to the product a disagreeable odor and otherwise deleteriously affect such product.

In accordance with the present invention much smaller concentrations of $SO_2$ are employed. While the concentration necessary to obtain a satisfactory product will vary depending upon the particular fish used, feeding tests have established that a concentration of approximately 350 parts per million will be sufficient for even the least desirable fish, and that smaller concentrations will produce satisfactory results in better grades. In addition, care is taken to eliminate free $SO_2$ and volatile $SO_2$ compounds from the final product. In this connection it has been found that concentrations of $SO_2$ higher than approximately 350 parts per million are undesirable inasmuch as the problem of eliminating the $SO_2$ and the volatile compounds resulting therefrom from the final product is appreciably increased.

It is the principal object of this invention to provide a process for treating marine products to increase the palatability thereof.

It is a further object of this invention to provide a process for treating marine products to eliminate disagreeable odors therefrom.

It is the additional object of this invention to provide a process for treating marine products to avoid undesirable subsequent discoloration of such products.

It is a further object of this invention to provide a palatable food product prepared from off-specie grade fish or other marine products.

These and other objects, uses and advantages of this invention will become apparent from the following description of the preferred materials, conditions and methods of treatment.

It has been determined that in many types of marine products there are present various amine and amine producing compounds which vary in quantity with the particular marine product. For example, it has been found that herring have approximately twice the amount of trimethyl amine as does cod and that hake have nearly four times such amount. It has been found by feeding tests that amine and amine producing compounds in a marine product are exceedingly detrimental to the palatability of such products, and further that the presence of relatively high concentrations of amine and amine producing compounds impart to the marine product a very disagreeable odor. In addition feeding tests have established that fish products having a pH value of approximately 6.0 are the most palatable and that those with a higher pH value are less palatable. Inasmuch as the amine and amine producing compounds are alkaline in nature, their destruction will result in a lower and more desirable pH value. Accordingly, the quality of a marine product as a pet food may be considerably enhanced by the removal from such product of the deleterious effects of the amine and amine producting compounds therein.

In accordance with the present invention this result is achieved by the treatment of the marine products with free $SO_2$. The $SO_2$ has been found to react with the amines in the product in such a manner as to destroy those characteristics of the amines which reduce the palatability of the product and impart to the product a disagreeable odor. In other words, the non-palatable ingredient present in off-specie marine products is rendered ineffective or neutralized by the $SO_2$. The reaction has been found also to reduce the pH value of the product which, as above described, further improves the palatability of the product. In addition, it has been found that the undesirable discoloration which occurs in many types of fish after canning will not take place in those products which have been properly treated with $SO_2$ in the manner to be hereinafter described. In this regard it should be noted that no bleaching of the product need occur and that concentrations of $SO_2$ far below those necessary for any bleaching action will appreciably retard this undesirable future discoloration.

A preferred form of the process of the present invention will now be described, it being understood that the amounts of the various materials specified are given by way of example only and that these amounts may be varied over a considerable range.

A make-up water is prepared containing on the order of 0.15% $SO_2$; next, a suitable mixture of fish and cereal is prepared. The make-up water is then added to the fish-cereal mixture in such proportions that the make-up water will comprise approximately 24% of the total mixture. After thorough mixing in a suitable vessel the mixture is cooked. The cooking operation is best performed by heating the mixture to approximately 170° F. by means of live steam. The cooking of various materials by direct application of live steam thereto is well known and will not therefore be described in detail. The direct application of live steam performs a dual function, it heats the mixture to a sufficient temperature for cooking purposes and also it drives substantially all of the $SO_2$ and the volatile compounds resulting therefrom from the mixture. It has been found that the live steam will have driven off all but negligible quantities of $SO_2$ within the time necessary to raise the mixture to the proper temperature for sufficient cooking. When the mixture has been sufficiently cooked it is placed in sealed containers for distribution and use.

While there has been described what is at present considered the preferred embodiment of the present invention, it will be appreciated by those skilled in the art that various changes and modifications can be made therein without departing from the essence of the invention and it is intended to cover all such changes and modifications as come within the true spirit and scope of the appended claims.

Having thus described the invention, I claim:

1. A process for preparing a marine product which comprises treating such product with a concentration of free $SO_2$ not greater than approximately 350 parts per million and then driving substantially all of the free $SO_2$ and volatile compounds resulting therefrom from the product.

2. A process for treating a marine product which comprises mixing such product with a make-up water and with free $SO_2$ in such proportions that the concentration of free $SO_2$ to marine product does not exceed approximately 350 parts per million and applying live steam to the mixture so as to cook the mixture and drive substantially all of the free $SO_2$ and volatile compounds resulting therefrom.

3. A process for treating a marine product which comprises mixing such product in its natural state with a make-up water and with free $SO_2$ in such proportions that the concentration of free $SO_2$ to marine product does not exceed approximately 350 parts per million and applying live steam to the mixture so as to cook the mixture and drive substantially all of the free $SO_2$ and volatile compounds resulting therefrom from the product.

CHARLES B. STEVENSON.

References Cited in the file of this patent

UNITED STATES PATENTS

| Number | Name | Date |
|---|---|---|
| 2,241,436 | Williams | May 13, 1941 |
| 2,461,651 | Mathiesen | Feb. 15, 1949 |
| 2,509,633 | Flanzy | May 30, 1950 |

OTHER REFERENCES

"Scientific Food Preservation," 1925, by Rector, pages 157 and 158.